United States Patent
Soula et al.

(10) Patent No.: US 12,372,128 B2
(45) Date of Patent: Jul. 29, 2025

(54) BAR FOR A BRAKED AIRCRAFT WHEEL

(71) Applicant: SAFRAN LANDING SYSTEMS, Velizy Villacoublay (FR)

(72) Inventors: Aurélie Soula, Moissy-Cramayel (FR); Patrice Palazzoli, Moissy-Cramayel (FR); Alexandre Daulny, Moissy-Cramayel (FR); Arnaud Caraty, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 339 days.

(21) Appl. No.: 17/596,550

(22) PCT Filed: Jun. 12, 2020

(86) PCT No.: PCT/EP2020/066382
§ 371 (c)(1),
(2) Date: Dec. 13, 2021

(87) PCT Pub. No.: WO2020/249783
PCT Pub. Date: Dec. 17, 2020

(65) Prior Publication Data
US 2022/0235835 A1 Jul. 28, 2022

(30) Foreign Application Priority Data
Jun. 14, 2019 (FR) ...................................... 1906393

(51) Int. Cl.
*F16D 65/12* (2006.01)
*B33Y 80/00* (2015.01)
(Continued)

(52) U.S. Cl.
CPC .............. *F16D 65/12* (2013.01); *B33Y 80/00* (2014.12); *B64C 25/44* (2013.01); *F16D 55/36* (2013.01);
(Continued)

(58) Field of Classification Search
CPC .. F16D 65/12; F16D 55/36; F16D 2065/1364; F16D 2250/00; B64C 25/44; B33Y 80/00
See application file for complete search history.

(56) References Cited

U.S. PATENT DOCUMENTS 6,003,954 A * 12/1999 Everhard ................ F16D 55/36
188/71.6
9,003,954 B2 * 4/2015 Salter ...................... F03D 80/50
92/72

(Continued)

FOREIGN PATENT DOCUMENTS

EP 2 940 340 A1 11/2015
EP 3 184 843 A2 6/2017
(Continued)

OTHER PUBLICATIONS

International Search Report for PCT/EP2020/066382 dated Sep. 28, 2020 (PCT/ISA/210).

*Primary Examiner* — Vishal R Sahni
(74) *Attorney, Agent, or Firm* — Sughrue Mion, PLLC

(57) ABSTRACT

The invention relates to a bar (10) for a braked aircraft wheel (103), the bar being for fitting to a rim (104) of the wheel in order to drive rotor brake disks (106*b*) in rotation. The bar comprises a substantially rectilinear body (11) having at least one segment (14) including two wings (15) connected together by a core (16) and intended to co-operate with the rotor disks. At least one brace element (17) connects a free edge of each of the wings to a central portion of the core.

17 Claims, 5 Drawing Sheets

(51) Int. Cl.
  *B64C 25/44* (2006.01)
  *F16D 55/36* (2006.01)
  *B23K 26/342* (2014.01)
  *B33Y 10/00* (2015.01)
  *F16D 65/02* (2006.01)

(52) U.S. Cl.
  CPC ............. *B23K 26/342* (2015.10); *B33Y 10/00* (2014.12); *F16D 2065/1364* (2013.01); *F16D 2065/138* (2013.01); *F16D 2065/1392* (2013.01); *F16D 2250/00* (2013.01)

(56) References Cited

U.S. PATENT DOCUMENTS

| | | | | |
|---|---|---|---|---|
| 9,850,968 | B2* | 12/2017 | Swank | B22F 10/25 |
| 10,077,818 | B2* | 9/2018 | Whittle | B64C 25/44 |
| 2005/0264090 | A1* | 12/2005 | Kaczynski | C23C 30/00 |
| | | | | 301/6.1 |
| 2015/0308526 | A1* | 10/2015 | Swank | F16D 65/02 |
| | | | | 419/53 |
| 2017/0174330 | A1* | 6/2017 | Rook | B64C 25/36 |
| 2017/0363162 | A1* | 12/2017 | Whittle | F16D 65/128 |
| 2018/0080513 | A1* | 3/2018 | Swank | B22F 10/25 |
| 2019/0331178 | A1* | 10/2019 | Steele | F16F 7/08 |
| 2020/0292017 | A1* | 9/2020 | French | F16D 65/0006 |
| 2021/0332864 | A1* | 10/2021 | Steele | F16D 65/0006 |
| 2022/0235835 | A1* | 7/2022 | Soula | B64C 25/42 |

FOREIGN PATENT DOCUMENTS

| | | |
|---|---|---|
| EP | 3 258 129 A1 | 12/2017 |
| EP | 3 473 541 A1 | 4/2019 |
| FR | 2 937 949 A1 | 5/2010 |

\* cited by examiner

BAR FOR A BRAKED AIRCRAFT WHEEL

CROSS REFERENCE TO RELATED APPLICATIONS

This application is a National Stage of International Application No. PCT/EP2020/066382 filed Jun. 12, 2021, claiming priority based on French Patent Application No. 1906393 filed Jun. 14, 2019, the entire contents of each of which being herein incorporated by reference in their entireties.

The present invention relates to the field of aviation and, more particularly, to braking aircraft wheels.

BACKGROUND OF THE INVENTION

Aircraft wheels are known that are mounted on undercarriages and that are provided with respective brakes. Such a brake generally comprises stator disks arranged in alternation with rotor disks that are driven in rotation by Inconel® alloy bars secured to the inner periphery of a rim of the wheel. The bars are received in peripheral notches in the rotor disks, and they extend in a direction that is substantially parallel to the axis of rotation of said wheel. Controlled pressure applied to the stack of disks gives rise to friction between the facing disks, and thus to a braking torque that slows down the rotation of the wheel.

The bars may be made integrally with the rim of the wheel, or they may be fitted thereto. With reference to FIG. 1A, certain prior art bars 1 have a cylindrical tail at one end 1a for engaging in orifices made in a disk or "web" of the rim, and at an opposite end 1b they have an orifice arranged to receive a screw that is screwed into a tapped orifice in the rim. Titanium wedges 2 are interposed between the bars 1 and the rim, firstly in order to position the bars 1 in a direction parallel to the axis of rotation of the wheel, and secondly in order to contribute to limiting the transfer of heat between the brake disks and the rim, which could be harmful for a tire mounted on said rim.

As shown in FIG. 1B, the bars 1 sometimes present an H-shaped cross-section that is broadly constant. Such a cross-section serves to withstand the stresses induced by braking and in particular the shear and bending stresses generated by slowing down the rotor disks.

By way of example, such bars are known from Document FR-A-2 937 949.

A braked aircraft wheel may have seven to eleven bars 1, depending on the size of the wheel. For an aircraft having two to six wheels per undercarriage and for a bar 1 weighing 500 grams (g) to 800 g, it can be seen that the bars contribute significantly to the overall weight of the wheel-and-brake assembly.

However, lightening aircraft has become an imperative for all aircraft manufacturers, particularly since regulations have been encouraging them to do so. Specifically, environmental standards require reduction in emissions of pollutants, and in particular of carbon dioxide ($CO_2$).

OBJECT OF THE INVENTION

An object of the invention is thus to propose a bar for a braked aircraft wheel that makes it possible in particular to reduce the weight of the wheel-and-brake assembly of an aircraft without degrading the mechanical strength of said bar.

SUMMARY OF THE INVENTION

For this purpose, the invention provides a bar for a braked aircraft wheel, the bar being for fitting to a rim of the wheel in order to drive rotor brake disks in rotation. The bar comprises a substantially rectilinear body having at least one segment including two wings connected together by a core and intended to co-operate with the rotor disks.

According to the invention, the bar includes at least one brace element connecting a free edge of each of the wings to a central portion of the core.

Such brace elements enable the thicknesses of the wings and of the core to be optimally determined, thereby enabling the overall weight of the bar to the reduced without degrading its mechanical strength.

In a particular embodiment, the brace element is a wall extending in a longitudinal direction of the bar between said free edge and the central portion of the core.

According to a particular characteristic, a portion of the body forms a fastener wedge for fastening the bar to the rim.

There is thus no longer any need to provide an operation of adding a wedge while putting the bar into place, thereby limiting the number of operations needed for putting the bar into place on the rim of the wheel.

Advantageously, the wedge includes recesses, thereby enabling the overall weight of the bar to be limited and also limiting the transfer of heat to the rim.

According to another particular characteristic, a portion of the body includes a trellis structure.

The invention also provides a braked aircraft wheel comprising a rim having an inner periphery defining a space for receiving both rotor brake disks and also such bars fastened to the rim in order to constrain the rotor brake disks to rotate with the rim.

The invention also provides landing gear including at least one such wheel and an aircraft including such landing gear.

The invention also provides a method of fabricating such a bar, the method comprising at least one operation of fabricating the body of the bar by additive fabrication.

In a particular implementation, the additive fabrication operation is performed in such a manner as to obtain the bar in a vertical position.

Alternatively, the additive fabrication operation is performed in such a manner as to obtain the bar in a horizontal position and it includes a step of making a trellis supporting a wall of the body of the bar.

Preferably, the additive fabrication operation makes use of laser beam melting on a bed of powder.

In particular manner, the powder is an Inconel® alloy powder.

BRIEF DESCRIPTION OF THE DRAWING

The invention can be better understood in the light of the following description, which is purely illustrative and non-limiting, and that should be read with reference to the accompanying drawings, in which.

DETAILED DESCRIPTION OF THE INVENTION

Figure 1A:
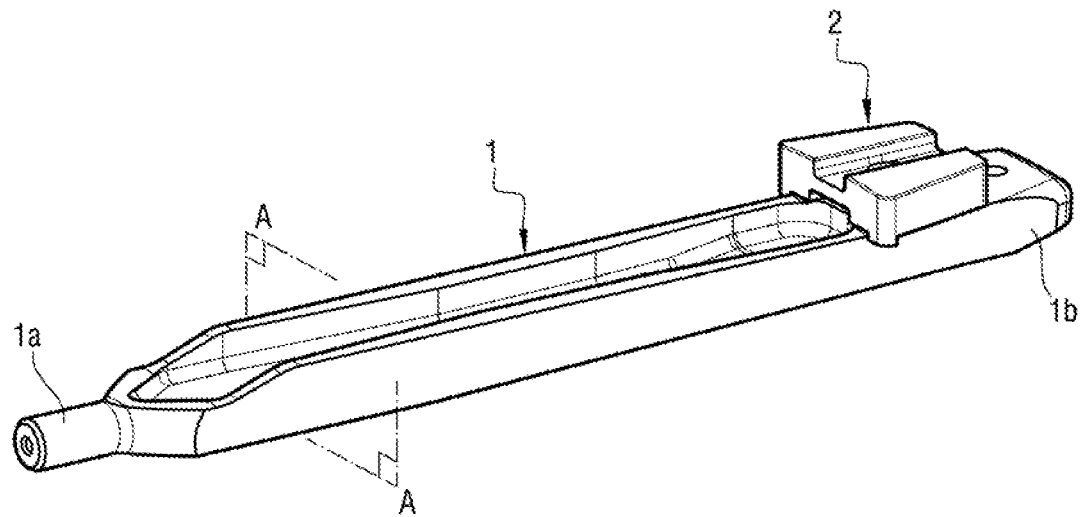
FIG. 1A is a perspective view of a prior art bar.
Figure 1B:
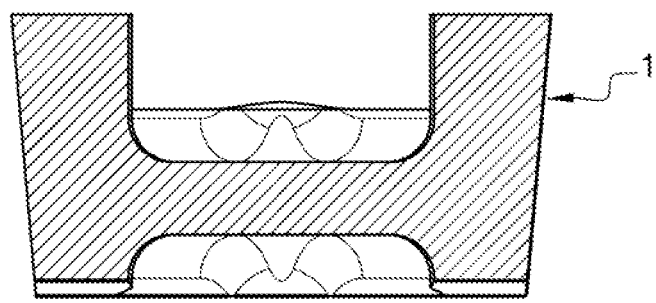
FIG. 1B is a cross-section view on a plane A-A of the bar shown in FIG. 1A.
Figure 2:
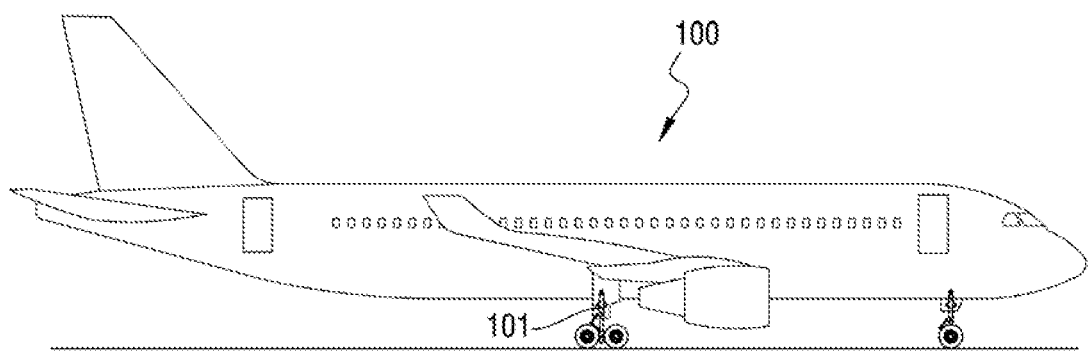
FIG. 2 is a side view of an aircraft including landing gear provided with braked wheels.
Figure 3:
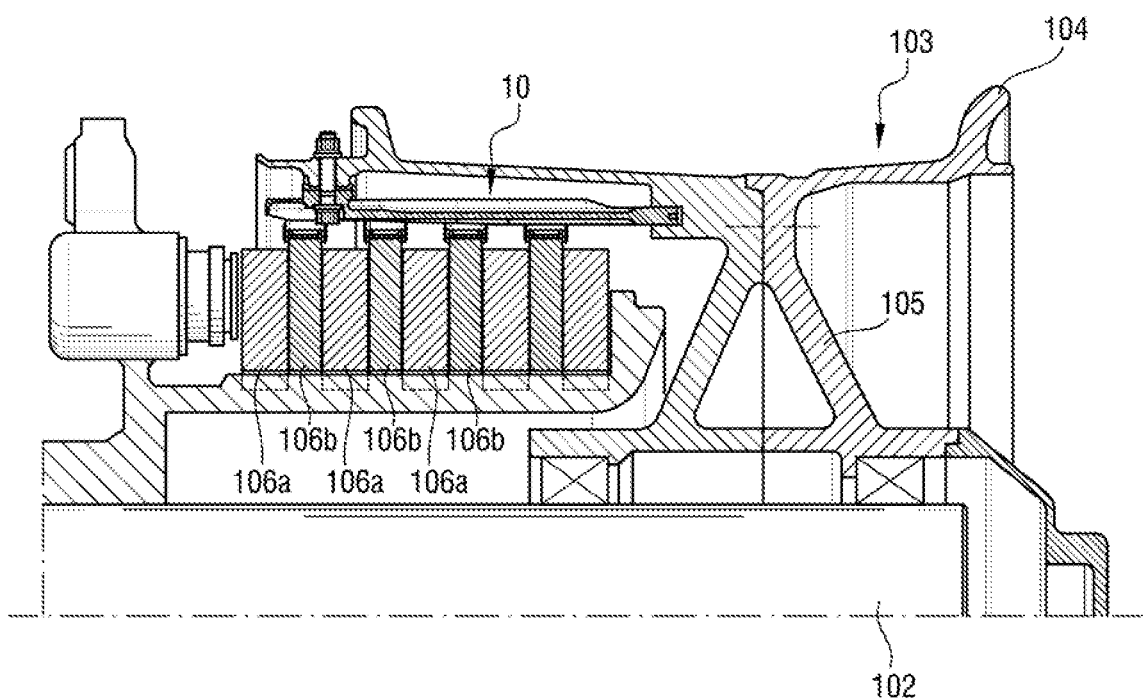
FIG. 3 is an axial section view of one of the braked wheels of the aircraft shown in FIG. 2, the rim of the wheel being fitted with bars in a particular embodiment of the invention.

With reference to FIGS. 2 and 3, an aircraft 100 of the invention comprises a structure provided with undercarriages 101. Each undercarriage 101 comprises a leg having one end hinged to the structure of the aircraft 100 and an opposite end carrying an axle 102 on which a wheel 103 is rotatably mounted.

The wheel 103 comprises a rim 104 and a web 105 connecting the rim 104 to a hub that is rotatably received on the axle 102 so that an inside surface of the rim 104 extends facing an outside surface of the hub and co-operates with the hub to define a space for receiving a stack of brake disks. The stack comprises stator disks 106a prevented from rotating relative to the leg of the undercarriage and rotor disks 106b including peripheral notches that receive bars, given overall reference 10, which bars are fastened to the inside surface of the rim 104.

Figure 4A:
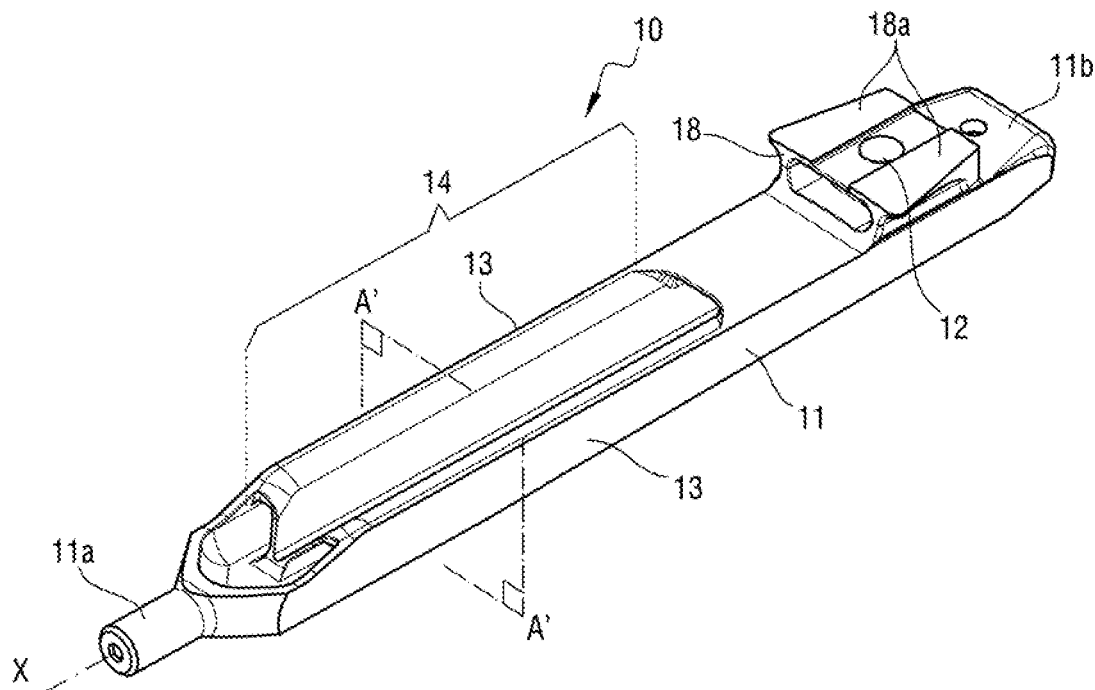
FIG. 4A is a perspective view of a bar of the braked wheel shown in FIG. 3.

With reference to FIG. 4A, each bar 10 comprises a body 11 extending along a longitudinal axis X. The body 11 has a first end 11a in the form of a cylindrical tail that is to be received in an orifice of the rim 104 extending parallel to the axis of rotation of the wheel 103, and a second end 11b including a hole 12 in a radial direction for receiving a fastener screw for fastening the bar 10 to the rim 104.

Figure 4B:
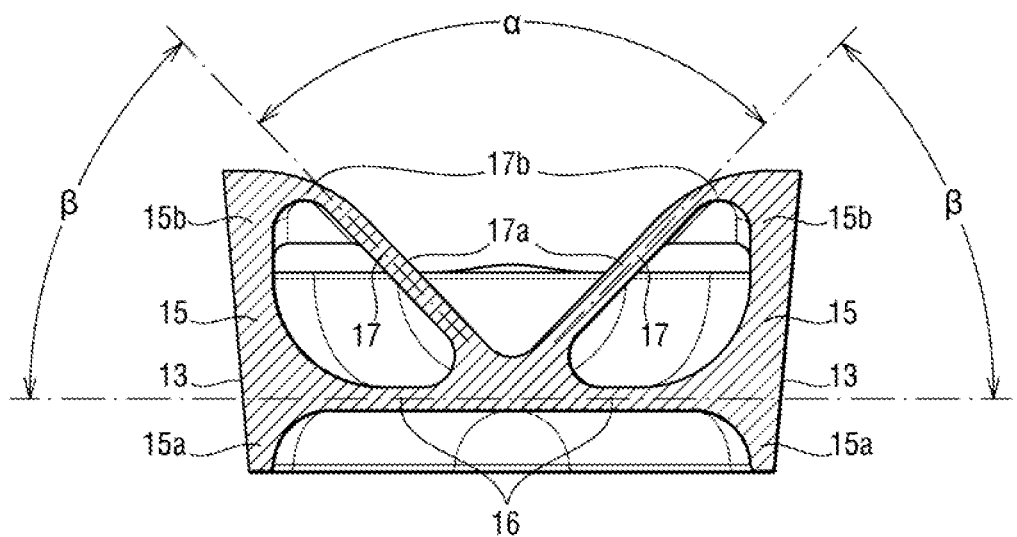
FIG. 4B is a cross section view on a plane a'-a' of the bar shown in FIG. 4A.

The body 11 also has two lateral bearing faces 13 extending parallel to the axis X for the purpose of cooperating with clips arranged in the peripheral notches of the rotor brake disks 106b. The two bearing faces 13 form a nonzero angle $\alpha$ so that in service they extend radially relative to the rim 104. High velocity oxy fuel (HVOF) surface treatment is applied to the bearing faces 13 in order to obtain appropriate tribological behavior between the bar 10 and the clips. All this is well-known and it is recalled merely for information purposes. Between the first end and the second end, and as shown in FIG. 4B, the body 11 includes a segment 14 that presents a cross-section that is broadly constant and symmetrical about a midplane of the body 11. The cross-section is substantially H-shaped and the segment 14 thus comprises two wings 15 having inside faces that are connected together by a core 16 and outside faces that form the bearing faces 13. Each wing 15 has a bottom portion 15a and a top portion 15b, which portions extend on opposite sides of the core 16. In this example, the top portions 15b of the wings 15 present a height that is greater than the height of the bottom portions 15a. In this example, the height of the top portions 15b of the wings 15 is substantially equal to four times the height of the bottom portions 15a of the wings 15. The distance between the free edges of the top portions 15b of the wings 15 is slightly greater than the distance between the free edges of the bottom portions 15a of the wings 15.

Furthermore, brace elements 17 connect the free edges of the top portions 15b of the wings 15 to a central portion of the core 16. Each brace element 17 has a wall with a plane zone 17a extending from the central portion of the core 16 and a rounded zone 17b that connects the plane zone 17a to the free edge of the top portion 15b of one of the wings 15. Relative to the core 16, the plane zone 17a of each brace element 17 forms an angle $\beta$ that is substantially equal to 45° in this example. The brace elements 17 serve to oppose any tendency of the wings 15 to be deformed or overturned while the bar 10 is in service, thereby enabling the thickness of the wings 15 and of the core 16 to be optimized.

A portion of the end 11b of the body 11 is shaped to constitute a fastener wedge 18 for fastening the bar 10 to the rim 104. The wedge 18 is thus made integrally with the bar 10 and the hole 12 passes through its center in order to be able to pass the fastener screw for fastening the bar 10 to the rim 104. At its top portion, the wedge 18 has two plane bearing faces 18a extending in the same plane for the purpose of cooperating with a plane surface of the rim 104. The two bearing faces 18a are arranged symmetrically on either side of the hole 12.

Figure 4C:
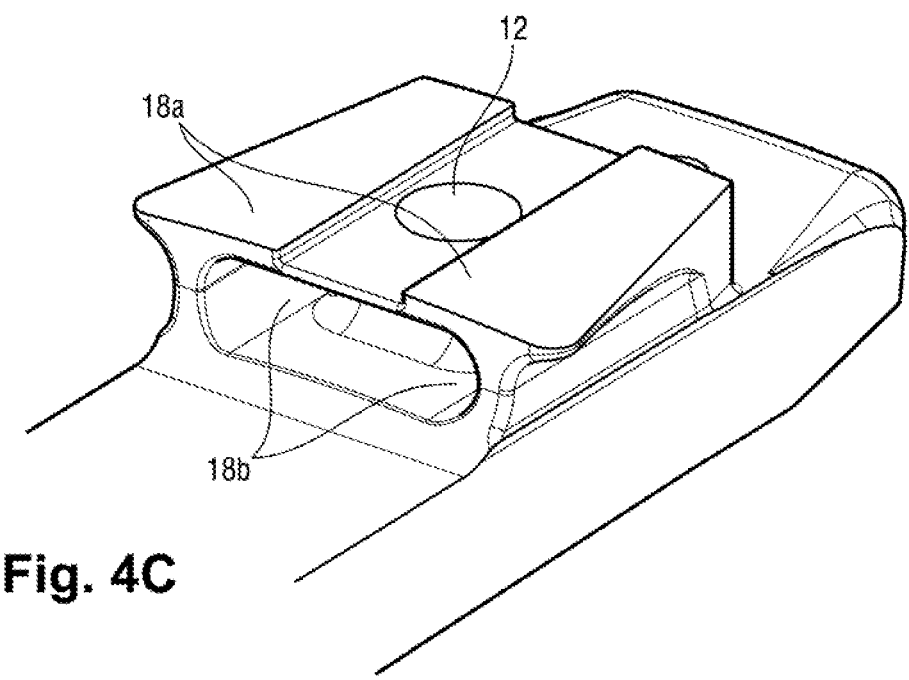
FIG. 4C is a detail face view of a portion of the bar shown in FIG. 4A.
Figure 4D:
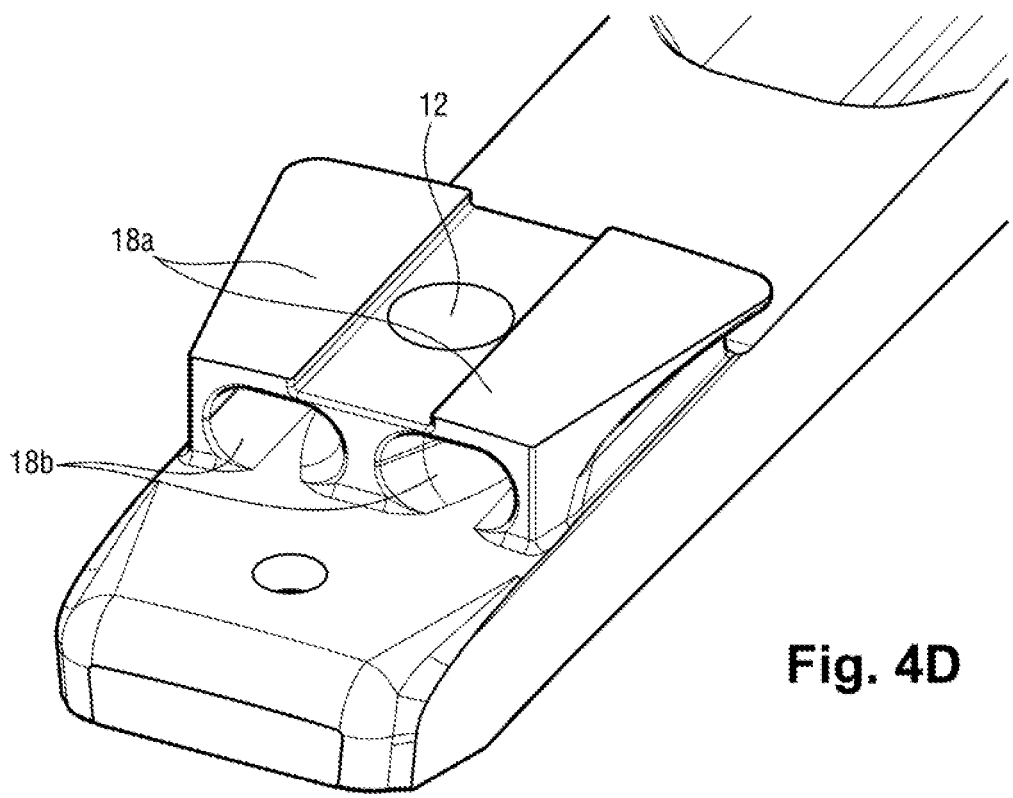
FIG. 4D is a detail rear view of a portion of the bar shown in FIG. 4A.

With reference to FIGS. 4C and 4D, the wedge 18 is hollowed out by making two channels 18b that extend on either side of the hole 12 substantially in a longitudinal direction relative to the bar. The channels 18b have several functions: they enable air to flow inside the wedge 18, in particular under the effect of a forced flow of air imparted by a brake cooling fan, and their presence limits the quantity of material of the wedge 18 that enables heat to be transferred by conduction from the rotor brake disks 106b to the rim 104.

The channels 18b thus reduce considerably the rate of heat conduction by the wedge 18, thereby contributing to significantly limiting the temperature rise of the rim 104, in particular where the bearing faces 18a of the wedge 18 bear against the rim 104, while preserving the ability of the wedge 18 to transmit braking torque to the rim 104.

The bar 10 is made by additive fabrication vertically along its axis X, and more particularly fabrication by laser beam melting (LBM) on a bed of metal powder. The bar 10 is then obtained in the vertical position. This method enables the bar 10 to be fabricated in a single operation on the basis of a three-dimensional (3D) digital file for said bar 10. The bar 10 is constructed by using selective melting of a powder of Inconel® alloy under a controlled atmosphere. The Inconel® alloy powder is spread by a scraper to form a bed of varying thickness in the range 30 micrometers ($\mu$m) to 90 $\mu$m. An optical fiber laser beam is steered by mirrors to scan the bed so as to melt the powder selectively in zones that are defined upstream by the 3D digital file. By way of example, the laser beam may be an yttrium aluminum garnet (YAG) laser beam.

In comparison with the bar 1 and for an identical fastener interface, the bar 10 makes it possible to achieve a weight saving for the bar-and-wedge assembly that lies in the range 15% to 20%. Furthermore, the mechanical strength and in particular the bending strength of the bar is improved.

Naturally, the invention is not limited to the implementations described, but covers any variant coming within the ambit of the invention as defined by the claims.

The body 11 of the bar 10 need not be integral with the wedge, but could have a bearing face arranged to receive a wedge that is fitted on the bar.

Figure 5:
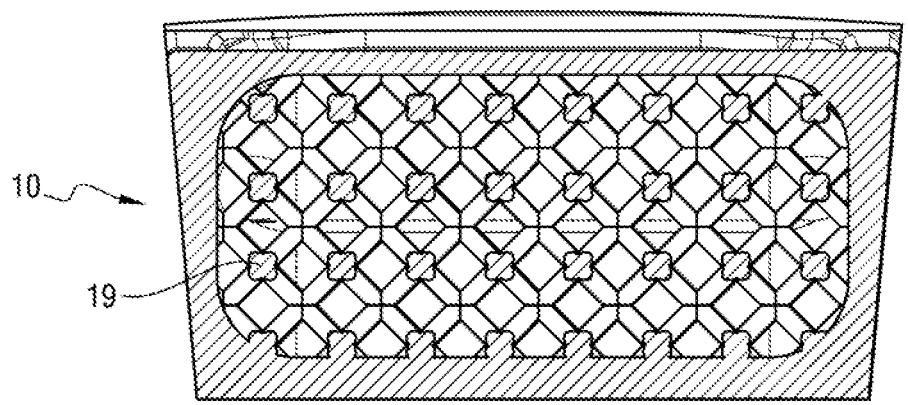
FIG. 5 is a cross-section view of a variant of the bar shown in FIG. 4A including a portion having a trellis structure.

In order to increase the stiffness of the bar 10, and also in order to enable the bar 10 to be additively fabricated from a powder in such a manner as to obtain the bar horizontally, a portion of the body 11 of said bar 10 may include a lattice structure 19, as shown in FIG. 5, in other words a hollowed-out trellis structure with a unit pattern that may for example be a tetrahedron, and that serves to support a wall of the bar.

The brace elements 17 may be of a shape other than those shown in FIG. 4B.

Although in this example the bar 10 is made by additive fabrication, it could also be made by other methods, e.g. by lost wax casting.

Powders other than Inconel® alloy powder could be used for fabricating the bar 10, in particular depending on the operating requirements for said bar (e.g. steel powder . . . ).

The invention claimed is:

1. A bar for a braked aircraft wheel, the bar being for fitting to a rim of the wheel in order to drive rotor brake disks in rotation, the bar comprising:
   a substantially rectilinear body having at least one segment including two wings which have:
   inside faces that are connected together by a core extending from the inside face of one of the two wings to the inside face of the other of the two wings, and
   outside faces that are opposed to the inside faces and intended to co-operate with the rotor disks,
   wherein the bar includes at least one brace element connecting a free edge of the inside face of one of the two wings to a central portion of the core without connecting the rest of the one of the two wings to the rest of the core, the brace element being integrally formed with said free edge and said central portion and defining with the core and said one of the two wings only one channel that extends in a longitudinal direction relative to the body and has a closed cross-section.

2. The bar according to claim 1, wherein the brace element is a wall extending in a longitudinal direction of the bar from said free edge of the inside face of one of the two wings to the central portion of the core.

3. The bar according to claim 1, wherein a portion of the body forms a fastener wedge for fastening the bar to the rim.

4. The bar according to claim 3, wherein said portion of the body forming the wedge includes recesses.

5. The bar according to claim 1, wherein a portion of the body includes a trellis structure.

6. A braked aircraft wheel comprising a rim having an inner periphery defining a space for receiving both rotor brake disks and a plurality of bars according to claim 1 fastened to the rim in order to constrain the rotor brake disks to rotate with the rim.

7. A landing gear including at least one of the braked aircraft wheel according to claim 6.

8. An aircraft including the landing gear according to claim 7.

9. A method of fabricating a bar according to claim 1, said method comprising at least one operation of fabricating the body of the bar by additive fabrication.

10. The method according to claim 9, wherein the additive fabrication operation is performed in such a manner as to obtain the bar in a vertical position.

11. The method according to claim 9, wherein the additive fabrication operation is performed to obtain the bar in a horizontal position, and
   wherein the method includes making a trellis structure supporting a wall of the body of the bar.

12. The method according to claim 9, wherein the additive fabrication operation makes use of laser beam melting on a bed of powder.

13. The method according to claim 12, wherein the powder is an Inconel® alloy powder.

14. The bar according to claim 1, wherein the inside face of each of the two wings has a bottom portion and a top portion which extend on opposite sides of the core.

15. The bar according to claim 14, wherein the at least one brace element connects the free edges of the top portions of the inside face of the two wings to the central portion of the core.

16. The bar according to claim 1, wherein the at least one segment is a cross-section that is symmetrical about a midplane of the body.

17. A bar for a braked aircraft wheel, the bar being for fitting to a rim of the wheel in order to drive rotor brake disks in rotation, the bar comprising:
   a substantially rectilinear body having at least one segment including two wings which have:
   inside faces that are connected together by a core extending from the inside face of one of the two wings to the inside face of the other of the two wings, and
   outside faces that are opposed to the inside faces and intended to co-operate with the rotor disks,
   wherein the bar includes at least one brace element connecting a free edge of the inside face of one of the two wings to a central portion of the core without connecting the rest of the one of the two wings to the rest of the core,
   the brace element being integrally formed with said free edge and said central portion and defining with the core and said one of the two wings only one tubular channel that extends in a longitudinal direction relative to the body.

* * * * *